(No Model.)
G. H. WESTON.
ROTARY ENGINE.
No. 417,762.           Patented Dec. 24, 1889.
Fig: 1.
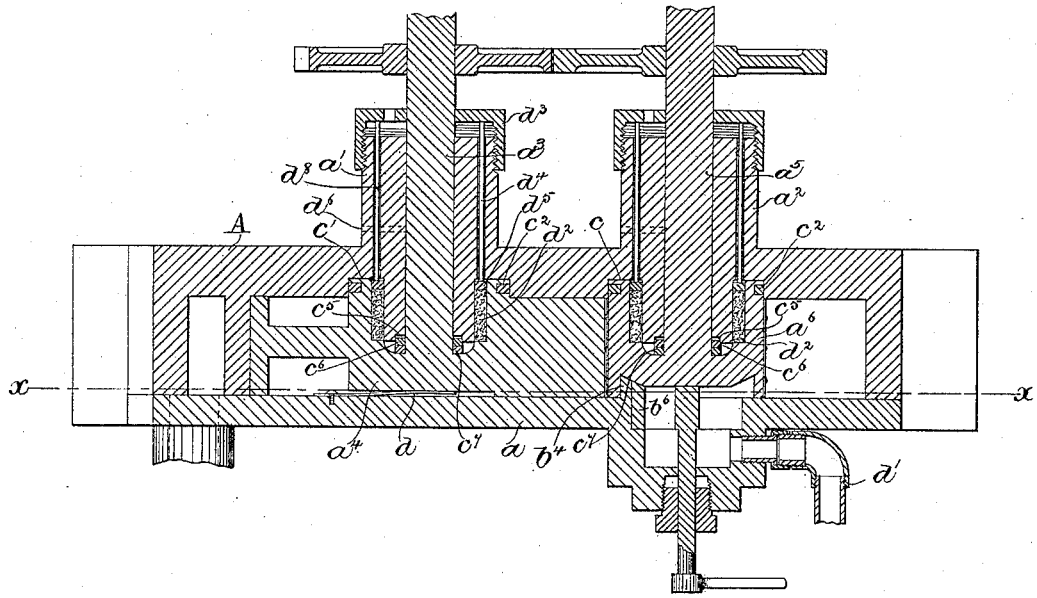
Fig: 2.
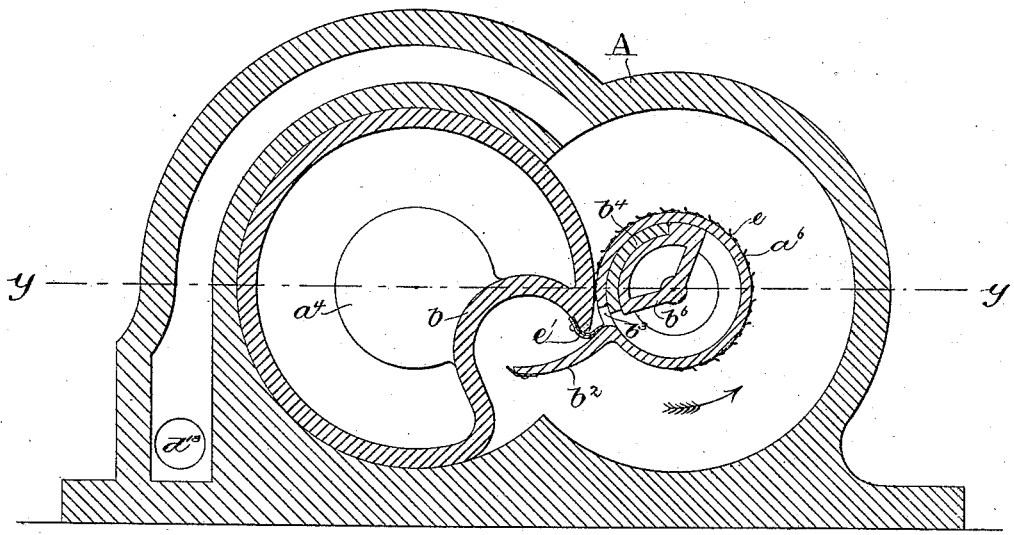
Witnesses:
Howard F. Eaton.
Frederick L. Emery.
Inventor:
George H. Weston
by Crosby & Gregory
Attys.

UNITED STATES PATENT OFFICE.

GEORGE H. WESTON, OF BOSTON, MASSACHUSETTS.

ROTARY ENGINE.

SPECIFICATION forming part of Letters Patent No. 417,762, dated December 24, 1889.

Application filed November 24, 1888. Serial No. 291,764. (No model.)

*To all whom it may concern:*

Be it known that I, GEORGE H. WESTON, of Boston, county of Suffolk, State of Massachusetts, have invented an Improvement in Rotary Engines, of which the following description, in connection with the accompanying drawings, is a specification, like letters on the drawings representing like parts.

This invention in rotary engines is an improvement upon the engine shown and described in United States Patent No. 392,653, dated November 13, 1888.

My present invention has for its object to provide the engine referred to with a novel packing, as will be described, whereby the joints between the parts of the engine are rendered steam-tight and the lubricated bearings more effectually protected from the action of the steam.

The particular features in which my invention consists will be pointed out in the claims at the end of this specification.

Figure 1 is a longitudinal section of my improved rotary engine, the section being taken on line $y$ $y$, Fig. 2; and Fig. 2, a vertical section on the line $x$ $x$, Fig. 1.

The shell or case A, provided with the hubs $a'$ $a^2$, the cylinder or abutment $a^4$, having the re-entrant portion $b$ and provided with the shaft $a^3$, the hollow piston-valve $a^6$, provided with the shaft $a^5$ and having the piston-arm $b^2$ to enter the said re-entrant portion, and the cover $a$, having the segmental arm $b^4$, forming part of the cut-off mechanism consisting of the sleeve $b^6$, are substantially as shown in the patent referred to, where like parts are represented by like letters.

The ends of the piston-valve $a^6$ and abutment $a^4$ are extended into annular grooves or recesses $c$ $c'$, respectively, in the case or shell A, and each of the said ends is provided with an annular groove, in which is fitted a packing-ring $c^2$, preferably of metal, the said rings expanding against the case or shell A to form a tight joint and prevent the escape of steam by the said rings. The hubs $a'$ $a^2$ are extended from the inner side of the case or shell, and each hub at its end is provided with an annular recess $c^5$, into which is fitted the ring $c^6$, the said ring abutting against the ring $c^7$ on the shafts $a^3$ $a^5$. The rings $c^7$ revolve against the rings $c^6$, and hold the abutment and piston-valve in their proper or true position away from the case or shell, thereby permitting the said abutment and valve to revolve with the minimum amount of friction, the rings $c^7$ being pressed against the rings $c^6$, as herein shown, by the flat spring $d$, secured to the cover $a$ and acting against the abutment, and by the impact of the steam upon the valve, the said steam being admitted through the inlet-pipe $d'$.

The hubs $a'$ $a^2$ form, with the abutment and piston-valve, annular chambers, which are filled with preferably soft packing material $d^2$, firmly pressed into said chambers, as shown, by the nuts $d^3$, acting on the rods $d^4$, extended through holes $d^8$ in the hubs $a'$ $a^2$, the said rods pressing against rings $d^5$, the said packing forming an additional safeguard against the escape or passage of steam to the lubricated bearings for the shafts, the said bearings being lubricated by oil or other lubricant admitted through the holes $d^6$, (indicated by dotted lines, Fig. 1.) The holes $d^8$ in the hubs $a'$ $a^2$ constitute vent-passages for the escape of any steam that may pass by the packing-rings $c^2$.

The packing above described perfectly protects the lubricated bearings from steam without excessive friction arising from tight packings.

To effect a steam-tight joint between the abutment and piston-valve, the latter is provided, as herein shown, with springs $e$, preferably of flat metal, secured to the outside of the said valve. The abutment is provided with the spring $e'$, which acts against the arm $b^2$ of the piston-valve, as in the patent referred to, and to obtain a tighter steam-joint between the said abutment and piston-arm the said spring has secured to it a layer or piece $a^3$ of cloth or other flexible or non-metallic material, which is pressed steam-tight against the piston-arm by the pressure of the steam passing through the outlet-port $b^3$ of the piston-valve. The shafts of the abutment and valve are coupled together, as herein shown, by gears $d$ $d$.

The operation of the rotary engine is the same as described in my patent referred to, the steam entering through the inlet-pipe $d'$ into the hollow valve, thence out through the port $b^3$, acting on the piston-arm and imparting rotation to the valve and cylinder or abutment, as indicated by arrow in Fig. 2. The exhaust-steam passes from the engine through the passage $d^7$ and exhaust-port $d^{18}$.

I claim—

1. In a rotary engine, the combination, with the case or shell A, provided with the hubs $a'$ $a^2$, extended into the said shell, of the abutment or cylinder $a^4$, forming with the hub $a'$ a chamber, the piston-valve $a^6$, forming with the hub $a^2$ a chamber, the loose packing $d^2$ in said chambers, and the packing-rings $c^6$ $c^7$, mounted on the shafts of said abutment and piston-valve, the rings $c^7$ being pressed against the rings $c^6$, as described, by the spring $d$ acting against the abutment and by the impact of the entering steam upon the valves, substantially as described.

2. In a rotary engine, the combination, with the shell A, provided with the hubs $a'$ $a^2$, extended into said shell, of the abutment $a^4$ and valve $a^6$, forming with the said hubs chambers to receive packing, the packing-rings $c^6$ $c^7$, mounted on the shafts of the said abutment and piston-valve, loose packing $d^2$ in the said chambers, a packing-ring $d^5$, and rods inserted through holes in the hubs $a'$ $a^2$, and nut $d^3$ to press said rods and ring $d^5$ against the loose packing, substantially as described.

3. In a rotary engine, the combination, with the shell or case having the hubs $a'$ $a^2$, of the abutment $a^4$, provided with the re-entrant portion $b$, the piston-valve $a^6$, having the piston-arm $b^2$ extended into said re-entrant portion, the spring-packing $e$, secured to said valve, and the spring $e'$, secured to the abutment, and the flexible packing secured to the said spring and pressed steam-tight against the piston-arm by the pressure of the steam, substantially as described.

In testimony whereof I have signed my name to this specification in the presence of two subscribing witnesses.

GEORGE H. WESTON.

Witnesses:
 JAS. H. CHURCHILL,
 B. DEWAR.